(12) United States Patent
Wang et al.

(10) Patent No.: US 12,516,887 B2
(45) Date of Patent: Jan. 6, 2026

(54) HEAT EXCHANGER AND AIR CONDITIONING SYSTEM HAVING SAME

(71) Applicant: Danfoss A/S, Nordborg (DK)

(72) Inventors: Leilei Wang, Haiyan (CN); Yanxing Li, Nordborg (DK); Jing Yang, Nordborg (DK); Weijun Wu, Nordborg (DK); Yan Li, Jiaxing (CN); Jing Yuan, Haiyan (CN)

(73) Assignee: DANFOSS A/S, Nordborg (DK)

( * ) Notice: Subject to any disclaimer, the term of this patent is extended or adjusted under 35 U.S.C. 154(b) by 210 days.

(21) Appl. No.: 18/562,990

(22) PCT Filed: May 13, 2022

(86) PCT No.: PCT/CN2022/092592
§ 371 (c)(1),
(2) Date: Nov. 21, 2023

(87) PCT Pub. No.: WO2022/247653
PCT Pub. Date: Dec. 1, 2022

(65) Prior Publication Data
US 2024/0183619 A1    Jun. 6, 2024

(30) Foreign Application Priority Data

May 25, 2021 (CN) .......................... 202110575178.9
May 25, 2021 (CN) .......................... 202121138787.X
(Continued)

(51) Int. Cl.
*F28F 9/02* (2006.01)
*F28D 7/16* (2006.01)

(52) U.S. Cl.
CPC ................ *F28D 7/163* (2013.01); *F28F 9/02* (2013.01)

(58) Field of Classification Search
CPC .................................. F28D 7/163; F28F 9/02
(Continued)

(56) References Cited

U.S. PATENT DOCUMENTS 6,595,272 B1    7/2003 Uchikawa et al.
11,499,747 B2 *  11/2022 Gullapalli ................ F28F 1/20
(Continued)

FOREIGN PATENT DOCUMENTS

CN    101806550 A    8/2010
CN    102230692 A    11/2011
(Continued)

OTHER PUBLICATIONS

Extended European Search Report for European Patent Application No. / Patent No. 22810380.0-1002 /4350267 PCT/CN2022092592, dated Apr. 10, 2025 (8 pages).
(Continued)

*Primary Examiner* — Davis D Hwu
(74) *Attorney, Agent, or Firm* — McCormick, Paulding & Huber PLLC

(57) ABSTRACT

A heat exchanger and an air conditioning system having same, wherein heat exchanger includes a first heat exchanger core and a second heat exchanger core, the first heat exchanger core including first heat exchange tubes and first fins, and the second heat exchanger core including second heat exchange tubes and second fins. The angle between the first heat exchanger core and the second heat exchanger core is α, the length of the first heat exchange tube is TL, the refrigerant circulation area of the first heat exchange tube is S, the width of the first fin is FW, the density of the first fin is FP, the height of the first fin is FH, the width of the first heat exchanger core is ML, the length of the second heat exchange tube is tl, the refrigerant circulation area of the second heat exchange tube is s, the width of the second fin (Continued)

is fw, the density of the second fin is fp, the height of the second fin is fh, the width of the second heat exchanger core is ml, and $0.016 \leq (TL \times ML \times FW \times FP \times FH \times s \times \cos \alpha)/(tl \times ml \times fw \times fp \times fh \times S) \leq 64$. In this way, the water drainage performance of the heat exchanger is improved, and the problem of water being blown from the heat exchanger is solved.

20 Claims, 14 Drawing Sheets

(30) Foreign Application Priority Data

Nov. 5, 2021 (CN) .......................... 202111310199.4
Nov. 5, 2021 (CN) .......................... 202122705721.0

(58) Field of Classification Search
USPC .......................................................... 165/175
See application file for complete search history.

(56) References Cited

U.S. PATENT DOCUMENTS

| | | | |
|---|---|---|---|
| 2003/0209344 A1* | 11/2003 | Fang | F28F 1/045 |
| | | | 165/174 |
| 2008/0041092 A1 | 2/2008 | Gorbounov et al. | |
| 2011/0232884 A1 | 9/2011 | Jiang et al. | |
| 2016/0069595 A1 | 3/2016 | Kim et al. | |
| 2017/0059252 A1 | 3/2017 | Zhou et al. | |
| 2018/0058763 A1 | 3/2018 | Wei | |
| 2018/0328632 A1 | 11/2018 | Hu et al. | |
| 2019/0212061 A1 | 7/2019 | Jin et al. | |
| 2021/0131736 A1 | 5/2021 | Joardar et al. | |

FOREIGN PATENT DOCUMENTS

| | | |
|---|---|---|
| CN | 103925745 A | 7/2014 |
| CN | 204188033 U | 3/2015 |
| CN | 204359002 U | 5/2015 |
| CN | 204718198 U | 10/2015 |
| CN | 205641693 U | 10/2016 |
| CN | 209960732 U | 1/2020 |
| CN | 210268332 U | 4/2020 |
| CN | 214333108 U | 10/2021 |
| CN | 216694561 U | 6/2022 |
| DE | 100 45 656 A1 | 4/2001 |
| WO | 200683435 A2 | 8/2006 |
| WO | 201636732 A1 | 3/2016 |
| WO | 2017190769 A1 | 11/2017 |
| WO | 202150426 A1 | 3/2021 |

OTHER PUBLICATIONS

International Search Report mailed on Aug. 5, 2022, in connection with corresponding International Application No. PCT/CN2022/092592 (7 pp., including machine-generated English translation).

* cited by examiner

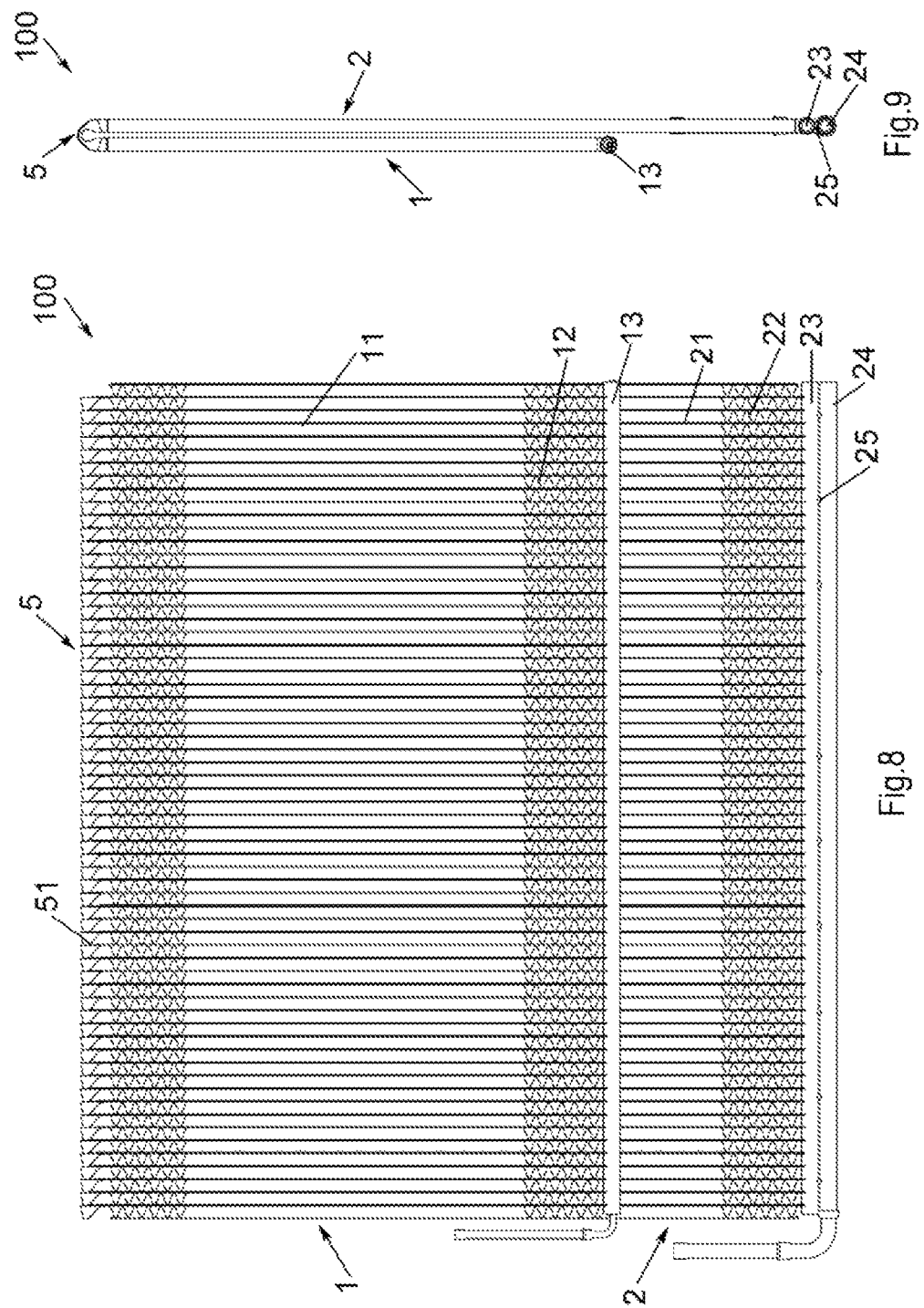

HEAT EXCHANGER AND AIR CONDITIONING SYSTEM HAVING SAME

CROSS-REFERENCE TO RELATED APPLICATIONS

This application is a National Stage application of International Patent Application No. PCT/CN2022/092592, filed on May 13, 2022, which claims priority to Chinese Patent Applications No. 202110575178.9, filed on May 25, 2021; No. 202121138787.X, filed on May 25, 2021; No. 202111310199.4, filed on Nov. 5, 2021; and No. 202122705721.0, filed on Nov. 5, 2021, each of which is hereby incorporated by reference in its entirety.

TECHNICAL FIELD

The embodiments of the present invention relate to a heat exchanger and an air conditioning system having same.

BACKGROUND

A heat exchanger comprises a manifold and heat exchange tubes. The heat exchanger may comprise multiple heat exchanger cores.

SUMMARY

An objective of embodiments of the present invention is to provide a heat exchanger and an air conditioning system having same, whereby, for example, the water drainage performance of the heat exchanger can be improved.

Embodiments of the present invention provide a heat exchanger, comprising: a first heat exchanger core, comprising: first heat exchange tubes, having first ends and second ends; and first fins arranged alternately with the first heat exchange tubes; and a second heat exchanger core, comprising: second heat exchange tubes, having first ends and second ends, the first ends of the second heat exchange tubes being connected to and in fluid communication with the first ends of the first heat exchange tubes; and second fins arranged alternately with the second heat exchange tubes, wherein: the first heat exchanger core is located at one side of the second heat exchanger core in a thickness direction of the second heat exchanger core, and an orthographic projection of the first heat exchanger core on a plane parallel to the second heat exchanger core at least partially overlaps the orthographic projection of the second heat exchanger core on a plane parallel to the second heat exchanger core, an angle between the first heat exchanger core and the second heat exchanger core is α, a length of the first heat exchange tube of the first heat exchanger core is TL, a refrigerant circulation area of the first heat exchange tube is S, a width of the first fin is FW, a density of the first fin is FP, a height of the first fin is FH, and a dimension of the first heat exchanger core in the direction of alternate arrangement of the first fins and the first heat exchange tubes is ML, a length of the second heat exchange tube of the second heat exchanger core is tl, a refrigerant circulation area of the second heat exchange tube is s, a width of the second fin is fw, a density of the second fin is fp, a height of the second fin is fh, and a dimension of the second heat exchanger core in the direction of alternate arrangement of the second fins and the second heat exchange tubes is ml, and $0.016 \leq (TL \times ML \times FW \times FP \times FH \times s \times \cos\alpha)/(tl \times ml \times fw \times fp \times fh \times S) \leq 64$.

According to embodiments of the present invention, $0° \leq \alpha \leq 45°$.

According to embodiments of the present invention, $0.005 \leq (TL \times ML \times FW \times FP \times FH)/(tl \times ml \times fw \times fp \times fh) \leq 18$.

According to embodiments of the present invention, $0.09 \leq (TL \times ML)/(tl \times ml) \leq 0.95$.

According to embodiments of the present invention, $0.21 \leq TL \times \cos\alpha/tl \leq 0.95$.

According to embodiments of the present invention, $0.05 \leq (FW \times FP \times FH)/(fw \times fp \times fh) \leq 18$.

According to embodiments of the present invention, $0.2 \leq (FW \times FP)/(fw \times fp) \leq 9$.

According to embodiments of the present invention, $0.28 \leq (TL \times s)/(tl \times S) \leq 3.5$.

According to embodiments of the present invention, the first heat exchange tube and second heat exchange tube are formed by bending a heat exchange tube, or the first heat exchanger core and second heat exchanger core are formed by bending a heat exchanger core.

According to embodiments of the present invention, the heat exchanger further comprises: a connecting part, wherein the first ends of the first heat exchange tubes of the first heat exchanger core are connected to and in fluid communication with the first ends of the second heat exchange tubes of the second heat exchanger core by means of the connecting part.

According to embodiments of the present invention, the connecting part comprises connecting tubes, and the first ends of the first heat exchange tubes of the first heat exchanger core are connected to and in fluid communication with the first ends of the second heat exchange tubes of the second heat exchanger core by means of the connecting tubes.

According to embodiments of the present invention, the connecting part comprises two connecting manifolds in fluid communication with each other; one of the two connecting manifolds is connected to and in fluid communication with the first ends of the first heat exchange tubes of the first heat exchanger core, and the other of the two connecting manifolds is connected to and in fluid communication with the first ends of the second heat exchange tubes of the second heat exchanger core.

According to embodiments of the present invention, the heat exchanger further comprises: a first manifold, connected to and in fluid communication with the second ends of the first heat exchange tubes of the first heat exchanger core, and a second manifold, connected to and in fluid communication with the second ends of the second heat exchange tubes of the second heat exchanger core.

According to embodiments of the present invention, the heat exchanger further comprises: an outlet side manifold, the outlet side manifold being in fluid communication, via a connecting tube, with one of the first and second manifolds which is at a refrigerant outlet side of the heat exchanger.

According to embodiments of the present invention, the heat exchanger further comprises: a refrigerant distributing means, wherein the refrigerant distributing means is disposed in one of the first and second manifolds which is at a refrigerant inlet side of the heat exchanger; or the refrigerant distributing means is disposed outside one of the first and second manifolds which is at the refrigerant inlet side of the heat exchanger, and in fluid communication with said one manifold via multiple connecting tubes.

According to embodiments of the present invention, the cross-sectional area of one of the first and second manifolds which is at a refrigerant inlet side of the heat exchanger is smaller than the cross-sectional area of the other of the first and second manifolds which is at a refrigerant outlet side of the heat exchanger.

According to embodiments of the present invention, the first manifold is used to flow refrigerant into the heat exchanger, and the second manifold is used to flow refrigerant out of the heat exchanger.

Embodiments of the present invention further provide an air conditioning system, comprising the heat exchanger described above.

According to embodiments of the present invention, the heat exchanger further comprises: a first manifold, connected to and in fluid communication with the second ends of the first heat exchange tubes of the first heat exchanger core, and a second manifold, connected to and in fluid communication with the second ends of the second heat exchange tubes of the second heat exchanger core; and the first manifold and the second manifold are arranged horizontally during use, and/or one of the first manifold and the second manifold is below the other during use.

According to embodiments of the present invention, during use, the second heat exchanger core is located upstream of the first heat exchanger core in a direction of air flow through the heat exchanger.

Using the heat exchanger and the air conditioning system having same according to embodiments of the present invention, for example, the water drainage performance of the heat exchanger can be improved.

BRIEF DESCRIPTION OF THE DRAWINGS

FIG. 8 is a schematic main view of the heat exchanger shown in FIG. 7.

FIG. 9 is a schematic side view of the heat exchanger shown in FIG. 7.

DETAILED DESCRIPTION

Figure 1:
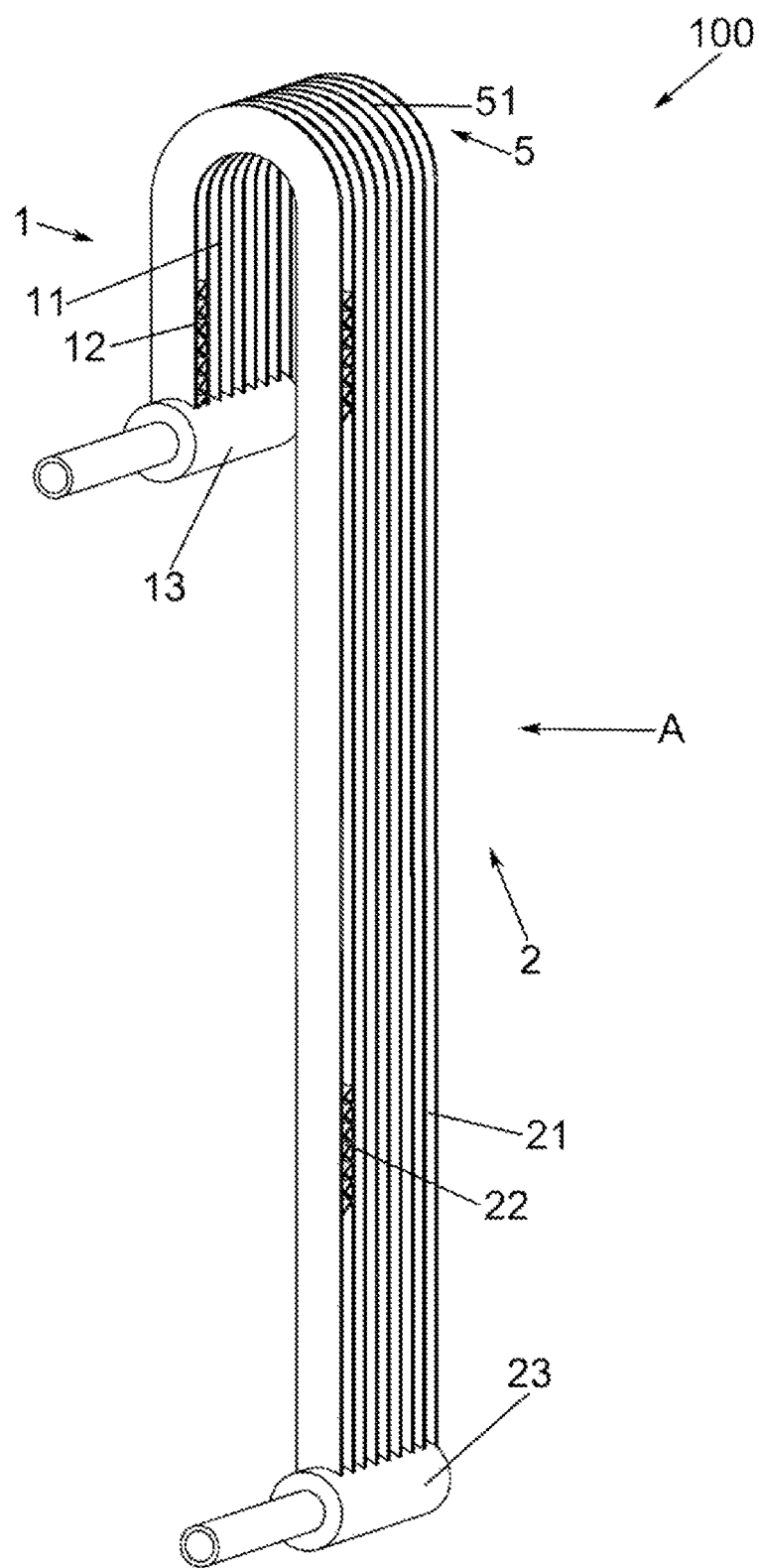
FIG. 1 is a schematic perspective view of a heat exchanger according to embodiments of the present invention.
Figure 2:
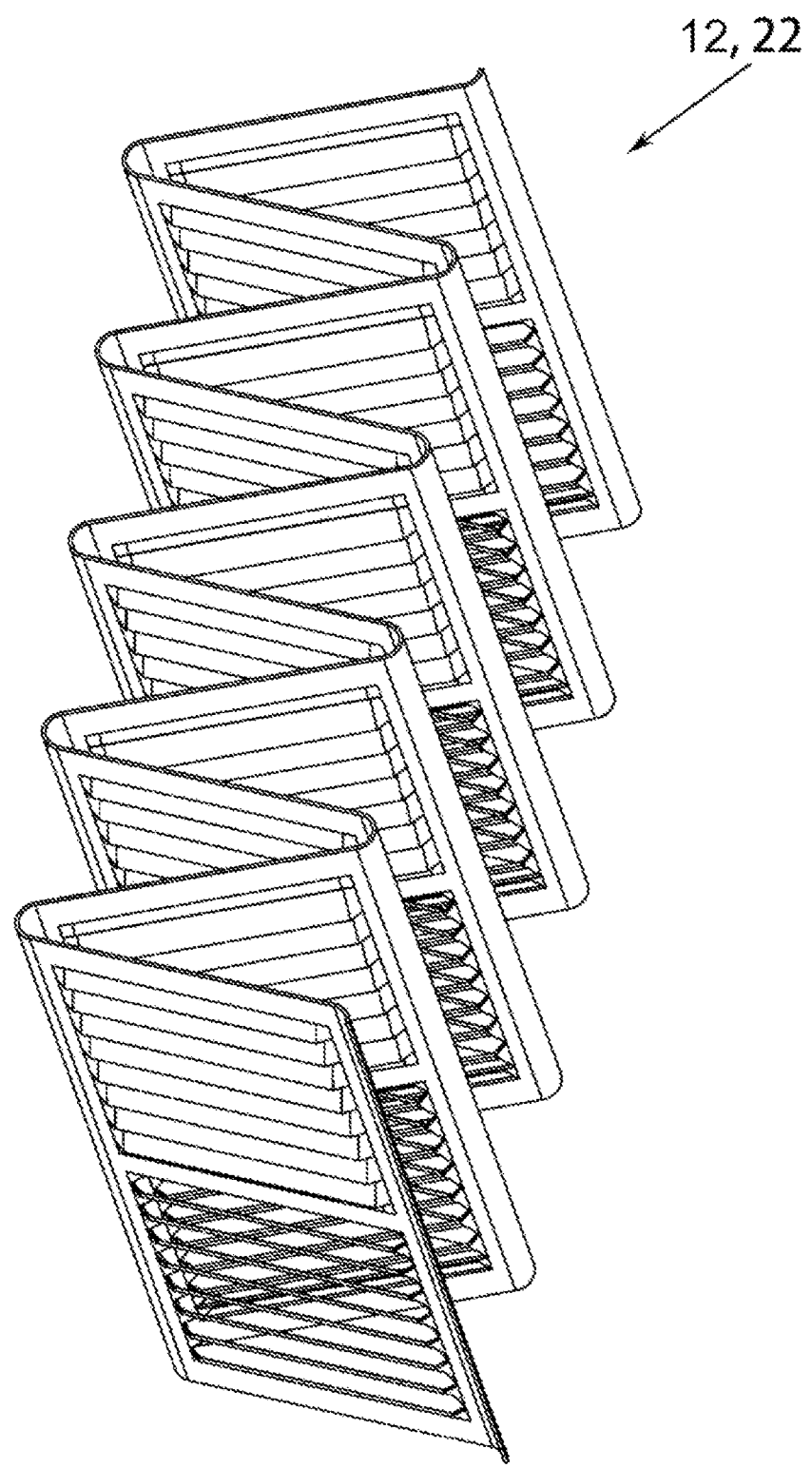
FIG. 2 is a schematic perspective view of a fin of a heat exchanger according to embodiments of the present invention.

The present invention is explained further below in conjunction with the accompanying drawings and specific embodiments.

Parallel-flow heat exchangers have advantages such as a compact structure, high heat exchange efficiency, a small refrigerant filling quantity and being environmentally friendly, so are widely used in condensers and evaporators of air conditioning systems. However, when a parallel-flow heat exchanger is used as an evaporator, and especially during use of a parallel-flow heat exchanger in an air conditioning system, the problem of water-blowing will occur: condensed water caused by the heat exchanger surface enters the room with inflowing air, and this will affect the customer experience. An existing solution is to install the parallel-flow heat exchanger obliquely, and utilize the action of gravity to make condensed water on the heat exchanger surface drip quickly down to a water collection tray. However, a structure of this kind increases the cost of the heat exchanger, and furthermore, condensed water will still be carried into the room by inflowing air in the process of dripping down.

An air conditioning system according to embodiments of the present invention comprises a compressor, and a heat exchanger serving as an evaporator or condenser.

Referring to FIGS. 1, 2, 7, 8 and 9, a heat exchanger 100 according to embodiments of the present invention comprises: a first heat exchanger core 1, the first heat exchanger core 1 comprising: first heat exchange tubes 11, the first heat exchange tubes 11 having first ends (e.g. upper ends in FIG. 1) and second ends (e.g. lower ends in FIG. 1); and first fins 12 arranged alternately with the first heat exchange tubes 11; and a second heat exchanger core 2, the second heat exchanger core 2 comprising: second heat exchange tubes 21, the second heat exchange tubes 21 having first ends (e.g. upper ends in FIG. 1) and second ends (e.g. lower ends in FIG. 1), the first ends of the second heat exchange tubes 21 being connected to and in fluid communication with the first ends of the first heat exchange tubes 11; and second fins 22 arranged alternately with the second heat exchange tubes 21. The first heat exchanger core 1 is located at one side of the second heat exchanger core 2 in the thickness direction of the second heat exchanger core 2, and the orthographic projection of the first heat exchanger core 1 on a plane parallel to the second heat exchanger core 2 at least partially overlaps the orthographic projection of the second heat exchanger core 2 on a plane parallel to the second heat exchanger core 2. For example, the orthographic projection of the first heat exchanger core 1 may substantially fall within the orthographic projection of the second heat exchanger core 2, or the orthographic projection of the smaller of the two cores may substantially fall within the orthographic projection of the larger core. The angle between the first heat exchanger core 1 and the second heat exchanger core 2 is α (i.e. the angle between a plane parallel to the first heat exchanger core 1 and a plane parallel to the second heat exchanger core 2 is α), the length of the first heat exchange tube 11 of the first heat exchanger core 1 is TL, the refrigerant circulation area of the first heat exchange tube 11 is S, the width of the first fin 12 is FW, the density of the first fin 12 is FP, the height of the first fin 12 is FH, and the dimension of the first heat exchanger core 1 in the direction of alternate arrangement of the first fins 12 and the first heat exchange tubes 11 (i.e. the width of the first heat exchanger core 1) is ML; the length of the second heat exchange tube 21 of the second heat exchanger core 2 is tl, the refrigerant circulation area of the second heat exchange tube 21 is s, the width of the second fin 22 is fw, the density of the second fin 22 is fp, the height of the second fin 22 is fh, and the dimension of the second heat exchanger core 2 in the direction of alternate arrangement of the second fins 22 and the second heat exchange tubes 21 (i.e. the width of the second heat exchanger core 2) is ml; and $0.016 \leq (TL \times ML \times FW \times FP \times FH \times s \times \cos \alpha)/(tl \times ml \times fw \times fp \times fh \times S) \leq 64$. It must be explained that the fin density is the number of crests (or number of troughs) per unit length in the direction of arrangement of multiple crests (or troughs) of the wave-like fin.

Figure 4:
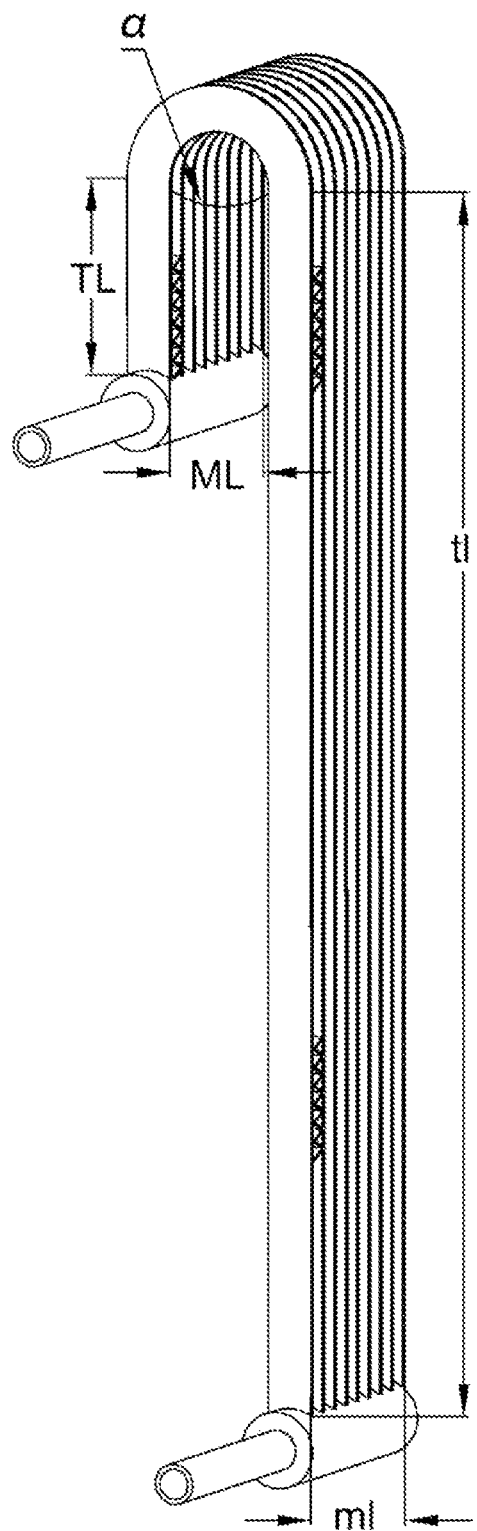
FIG. 4 is a schematic perspective view of the heat exchanger shown in FIG. 1, with parameters of the heat exchanger labelled.
Figure 5:
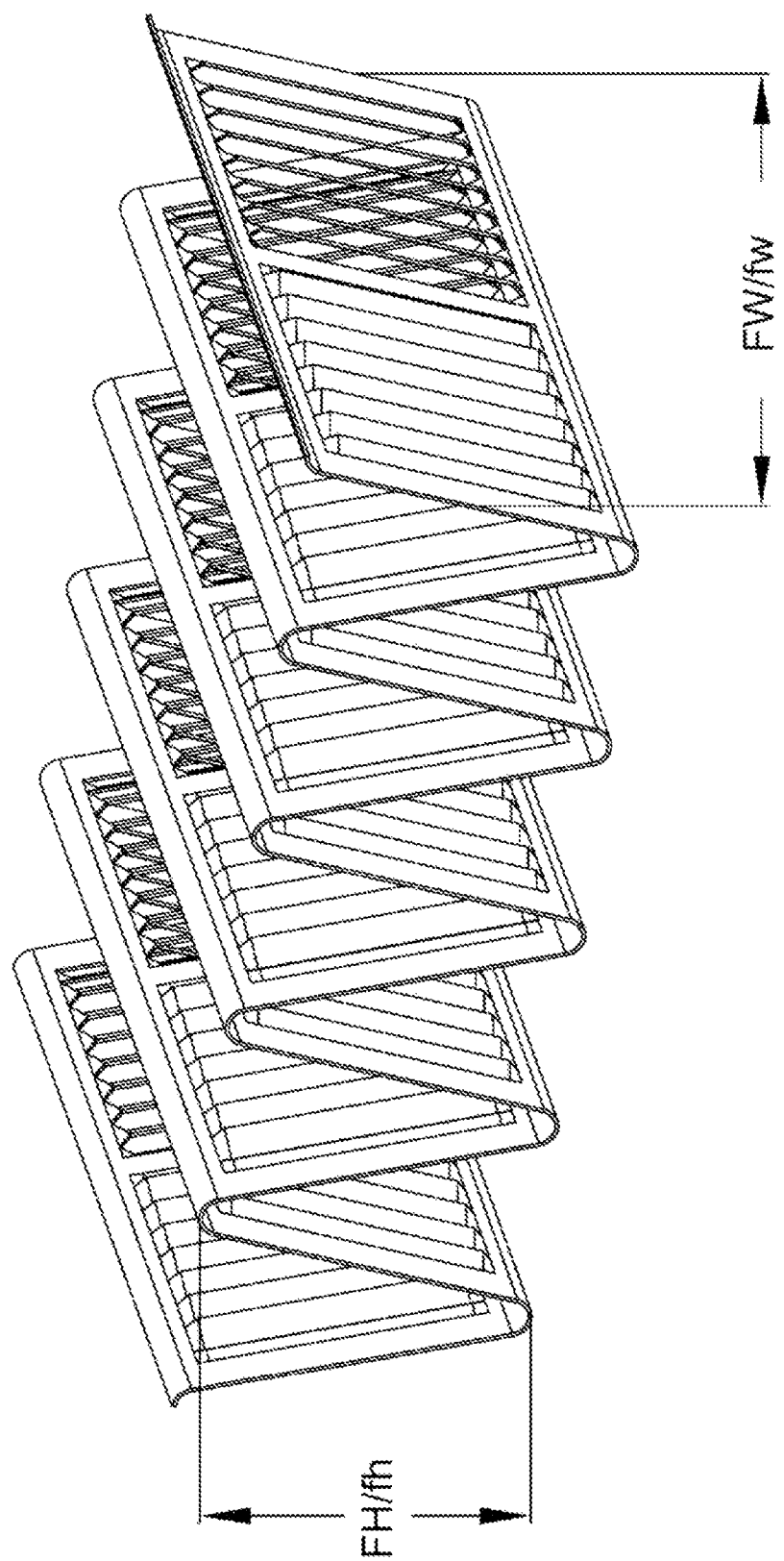
FIG. 5 is a schematic perspective view of the fin shown in FIG. 2, with parameters of the fin labelled.
Figure 6:
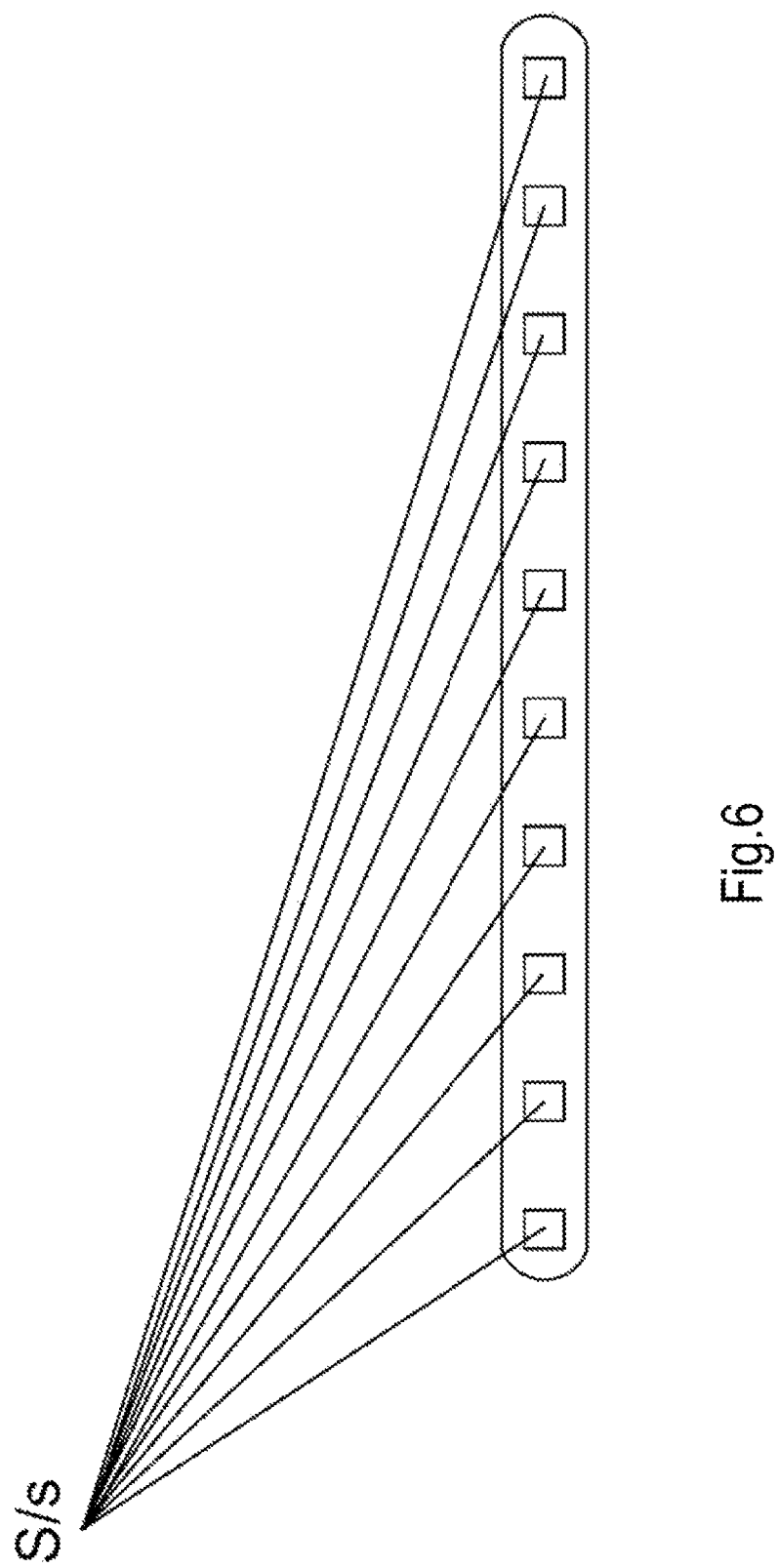
FIG. 6 is a schematic sectional drawing of an embodiment of a heat exchange tube in FIG. 1, with parameters of the heat exchange tube labelled.

FIG. 4 is a schematic perspective view of the heat exchanger shown in FIG. 1, with the following parameters of the heat exchanger 100 labelled: the length TL of the first heat exchange tube 11 of the first heat exchanger core 1, the dimension ML of the first heat exchanger core 1 in the direction of alternate arrangement of the first fins 12 and the first heat exchange tubes 11 (i.e. the width of the first heat exchanger core 1), the angle α between the first heat exchanger core 1 and the second heat exchanger core 2 (i.e. the angle α between a plane parallel to the first heat exchanger core 1 and a plane parallel to the second heat exchanger core 2), the length tl of the second heat exchange tube 21 of the second heat exchanger core 2, and the dimension ml of the second heat exchanger core 2 in the direction of alternate arrangement of the second fins 22 and the second heat exchange tubes 21 (i.e. the width of the second heat exchanger core 2). FIG. 5 is a schematic perspective view of the fins 12, 22 shown in FIG. 2, with the following parameters of the fin labelled: the width FW of the first fin 12, the height FH of the first fin 12, the width fw of the second fin 22, and the height fh of the second fin 22. FIG. 6 is a schematic sectional drawing of an embodiment of the first heat exchange tube 11 of the first heat exchanger core 1 and the second heat exchange tube 21 of the second heat exchanger core 2 in FIG. 1, wherein the heat exchange tube is a flat tube comprising multiple channels, and the refrigerant circulation area of the heat exchange tube is the sum of the refrigerant circulation areas of the multiple channels. The following parameters of the heat exchange tube are labelled in FIG. 6: the refrigerant circulation area S of the first heat exchange tube 11, and the refrigerant circulation area s of the second heat exchange tube 21.

Figure 3:
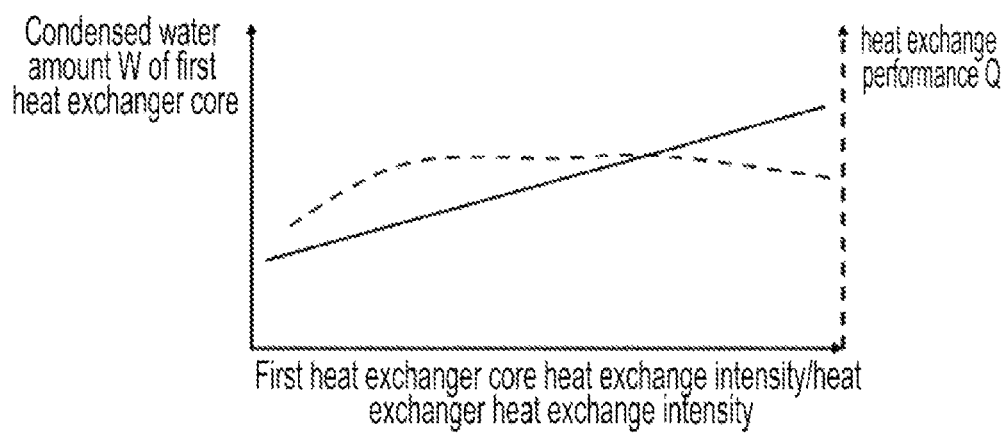
FIG. 3 is relationship graph of heat exchange performance Q and the condensed water amount W of the first heat exchanger core of a heat exchanger according to embodiments of the present invention.

It was discovered through a large amount of experimental research into heat exchangers by the inventors that, as shown by the relationship graph of heat exchange performance Q and the condensed water amount W of the first heat exchanger core in FIG. 3, the condensed water amount of the first heat exchanger core 1 can be improved by adjusting the heat exchange intensity of the first heat exchanger core 1 within a suitable range, without affecting the total heat exchange amount of the heat exchanger 100; thus, the problem of water being blown from an air conditioning system can be solved by adjusting the heat exchange intensity of different rows of heat exchanger cores.

According to the principles of heat transfer, the condensed water amount of the first heat exchanger core 1 can be adjusted by adjusting the heat exchange area of the first heat exchanger core 1, e.g. adjusting parameters such as the length of the first heat exchange tube 11 or the width of the first heat exchanger core 1; the condensed water amount of the first heat exchanger core 1 can also be adjusted by adjusting the air-side heat exchange intensity of the first heat exchanger core 1, e.g. adjusting parameters such as the width of the first fin 12 or the fin density; and the condensed water amount of the first heat exchanger core 1 can also be adjusted by adjusting the refrigerant-side heat exchange intensity. The condensed water of the first heat exchanger core 1 can be improved by adjusting the first heat exchanger core 1, but this also causes other problems; for example, when the heat exchange area of the first heat exchanger core 1 is reduced, the total heat exchange amount of the heat exchanger 100 is also affected. Thus, taking into account all of the requirements of the heat exchanger 100 together, when $0.016 \leq (TL \times ML \times FW \times FP \times FH \times s \times \cos \alpha)/(tl \times ml \times fw \times fp \times fh \times S) \leq 64$ is satisfied, the change in heat exchange performance of the heat exchanger can be controlled within 5%, and the problem of water being blown from the air conditioning system does not arise while the heat exchange capability of the air conditioning system is not affected.

According to embodiments of the present invention, $0° \leq \alpha \leq 45°$. For example, in FIG. 1, the first heat exchanger core 1 and the second heat exchanger core 2 are parallel, so the angle α between the first heat exchanger core 1 and the second heat exchanger core 2 is equal to zero.

According to embodiments of the present invention, the problem of water being blown from the heat exchanger can be mitigated by adjusting the ratio of total heat exchange areas of the first heat exchanger core and the second heat exchanger core, e.g. $0.005 \leq (TL \times ML \times FW \times FP \times FH)/(tl \times ml \times fw \times fp \times fh) \leq 18$.

According to embodiments of the present invention, the problem of water being blown from the heat exchanger can be solved by adjusting the ratio of airflow-facing areas of the first heat exchanger core 1 and the second heat exchanger core 2, e.g. $0.09 \leq (TL \times ML)/(tl \times ml) \leq 0.95$.

According to embodiments of the present invention, the problem of water being blown from the heat exchanger can be solved by adjusting the ratio of heat exchange tube lengths of the first heat exchanger core and the second heat exchanger core, e.g. $0.21 \leq TL \times \cos \alpha/tl \leq 0.95$.

According to embodiments of the present invention, the problem of water being blown from the heat exchanger can be solved by adjusting the ratio of total fin heat exchange areas of the first heat exchanger core and the second heat exchanger core, e.g. $0.05 \leq (FW \times FP \times FH)/(fw \times fp \times fh) \leq 18$.

According to embodiments of the present invention, the problem of water being blown from the heat exchanger can be solved by adjusting the ratio of fin densities of the first heat exchanger core and the second heat exchanger core, e.g. $0.2 \leq (FW \times FP)/(fw \times fp) \leq 9$.

According to embodiments of the present invention, the problem of water being blown from the heat exchanger can be solved by adjusting the ratio of refrigerant circulation areas of the first heat exchanger core and the second heat exchanger core, e.g. $0.28 \leq (TL \times s)/(tl \times S) \leq 3.5$.

According to embodiments of the present invention, referring to FIG. 1, the first heat exchange tube 11 and second heat exchange tube 12 are formed by bending a heat exchange tube, or the first heat exchanger core 1 and second heat exchanger core 2 are formed by bending a heat exchanger core.

According to embodiments of the present invention, the heat exchanger 100 further comprises: a connecting part 5, by means of which connecting part 5 the first ends of the first heat exchange tubes 11 of the first heat exchanger core 1 are connected to and in fluid communication with the first ends of the second heat exchange tubes 21 of the second heat exchanger core 2.

Figure 7:
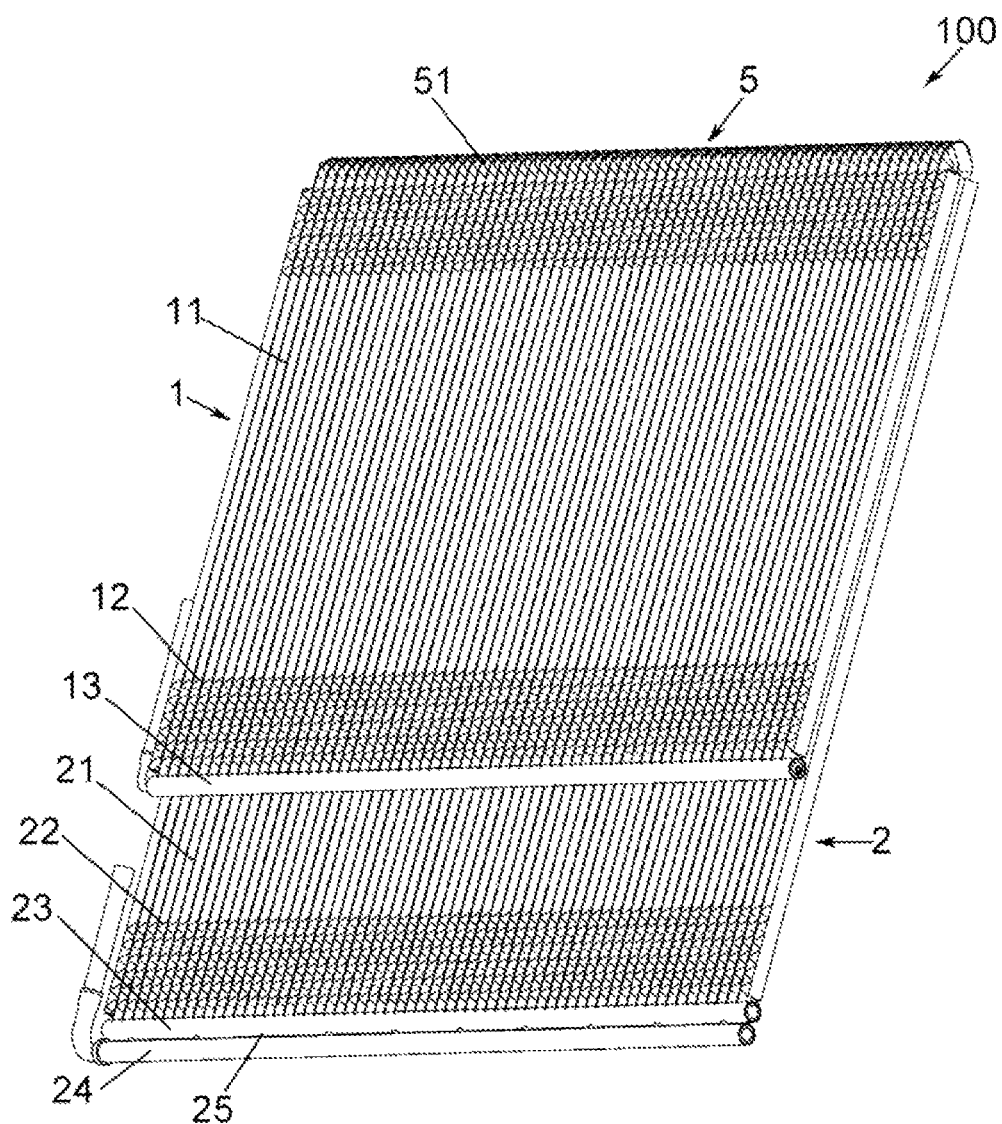
FIG. 7 is a schematic perspective view of a heat exchanger according to a variant example in embodiments of the present invention.

In embodiments of the present invention, referring to FIGS. 1, 7 and 8, the connecting part 5 may comprise multiple connecting tubes 51, and the first ends of the first heat exchange tubes 11 of the first heat exchanger core 1 are respectively connected to the first ends of the second heat exchange tubes 21 of the second heat exchanger core 2 by means of the multiple connecting tubes 51. In the embodiments shown in the figures, the first heat exchanger core 1 and the second heat exchanger core 2 are formed by bending the same heat exchanger core, and a curved portion of the heat exchanger core forms the connecting part 5. The connecting part 5 may comprise heat exchange tubes as the multiple connecting tubes 51, and fins arranged alternately with the multiple connecting tubes 51. In addition, the connecting part 5 may also be another form of connecting part 5; the first heat exchange tubes 11 of the first heat exchanger core 1 are connected to the second heat exchange tubes 21 of the second heat exchanger core 2 by means of the connecting part 5, but the first heat exchange tubes 11 of the first heat exchanger core 1 and the second heat exchange tubes 21 of the second heat exchanger core 2 are not connected in one-to-one correspondence.

For example, in embodiments of the present invention, referring to FIGS. 1, 7 and 8, the connecting part 5 may comprise two connecting manifolds in fluid communication with each other; one of the two connecting manifolds is connected to and in fluid communication with the first ends of the first heat exchange tubes 11 of the first heat exchanger core 1, and the other of the two connecting manifolds is connected to and in fluid communication with the first ends of the second heat exchange tubes 21 of the second heat exchanger core 2. Thus, the first ends of the first heat exchange tubes 11 of the first heat exchanger core 1 are connected to and in fluid communication with the first ends of the second heat exchange tubes 21 of the second heat exchanger core 2 by means of the connecting part 5.

In embodiments of the present invention, referring to FIGS. 1, 7, 8 and 9, the heat exchanger 100 further comprises: a first manifold 13 connected to and in fluid communication with the second ends of the first heat exchange tubes 11 of the first heat exchanger core 1, and a second manifold 23 connected to and in fluid communication with the second ends of the second heat exchange tubes 21 of the second heat exchanger core 2. According to an example of the present invention, referring to FIGS. 7-9, the heat exchanger 100 further comprises: an outlet side manifold 24, the outlet side manifold 24 being in fluid communication, via a connecting tube 25, with one of the first and second manifolds 13 and 23 which is at a refrigerant outlet side of the heat exchanger 100. For example, one or more connecting tubes 25 are used to establish fluid communication between the outlet side manifold and said one manifold, via one or more openings penetrating a tube wall of the outlet side manifold 24 and one or more openings penetrating a tube wall of said one manifold. The outlet side manifold 24 may extend in substantially the same direction as said one manifold. In the embodiment shown, the second manifold 23 is at the refrigerant outlet side of the heat exchanger 100. For example, one or more connecting tubes 25 are used to establish fluid communication between the outlet side manifold 24 and the second manifold 23, via one or more openings penetrating a tube wall of the outlet side manifold 24 and one or more openings penetrating a tube wall of the second manifold 23. The outlet side manifold 24 may extend in substantially the same direction as the second manifold 23. The cross-sectional area of one of the first and second manifolds 13 and 23 which is at a refrigerant inlet side of the heat exchanger 100 may be smaller than the cross-sectional area of the other of the first and second manifolds 13 and 23 which is at the refrigerant outlet side of the heat exchanger 100.

Figure 10:
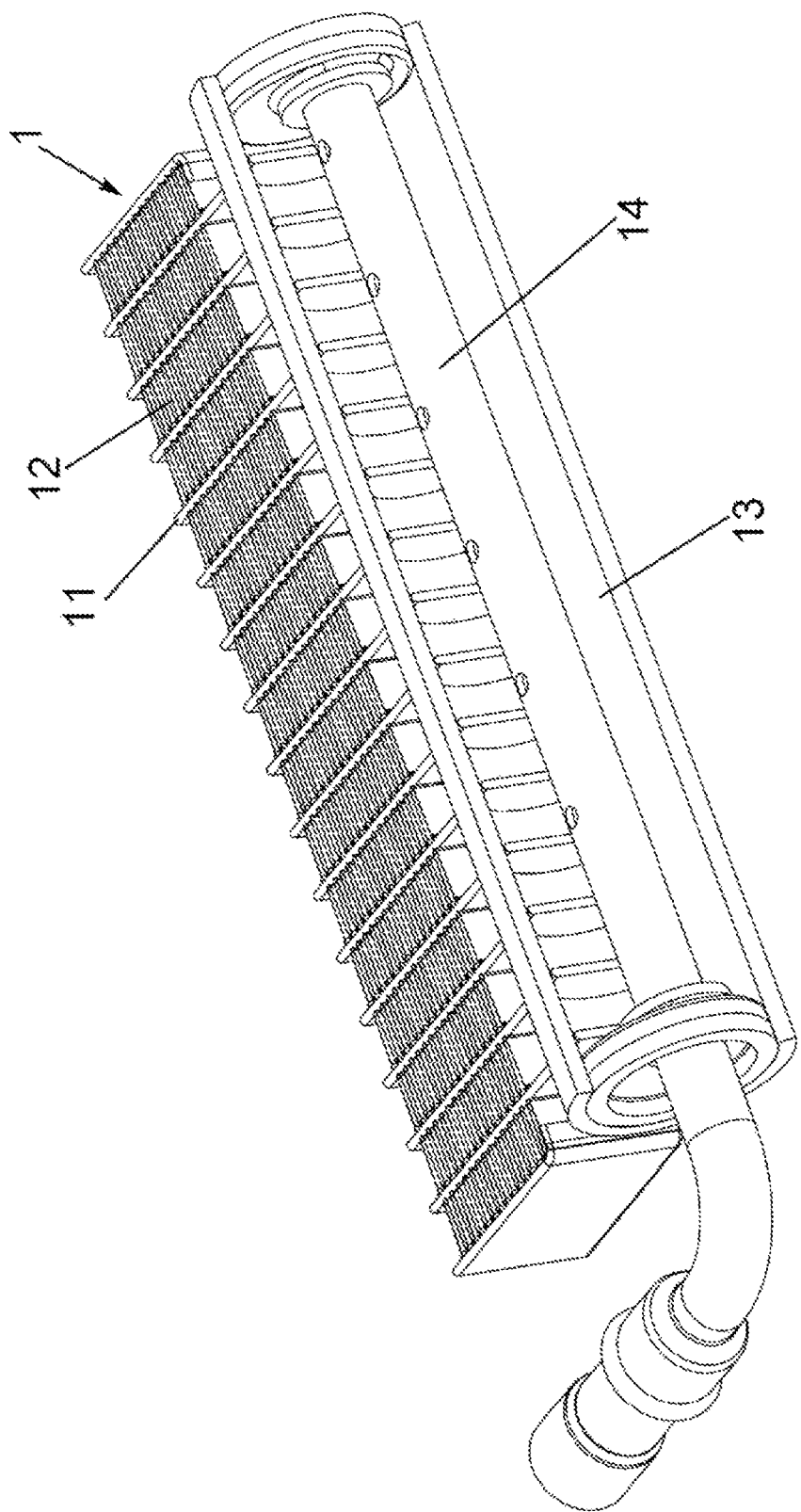
FIG. 10 is a schematic perspective view of part of a heat exchanger according to embodiments of the present invention, with the manifold cut open to show a refrigerant distributing means.
Figure 11:
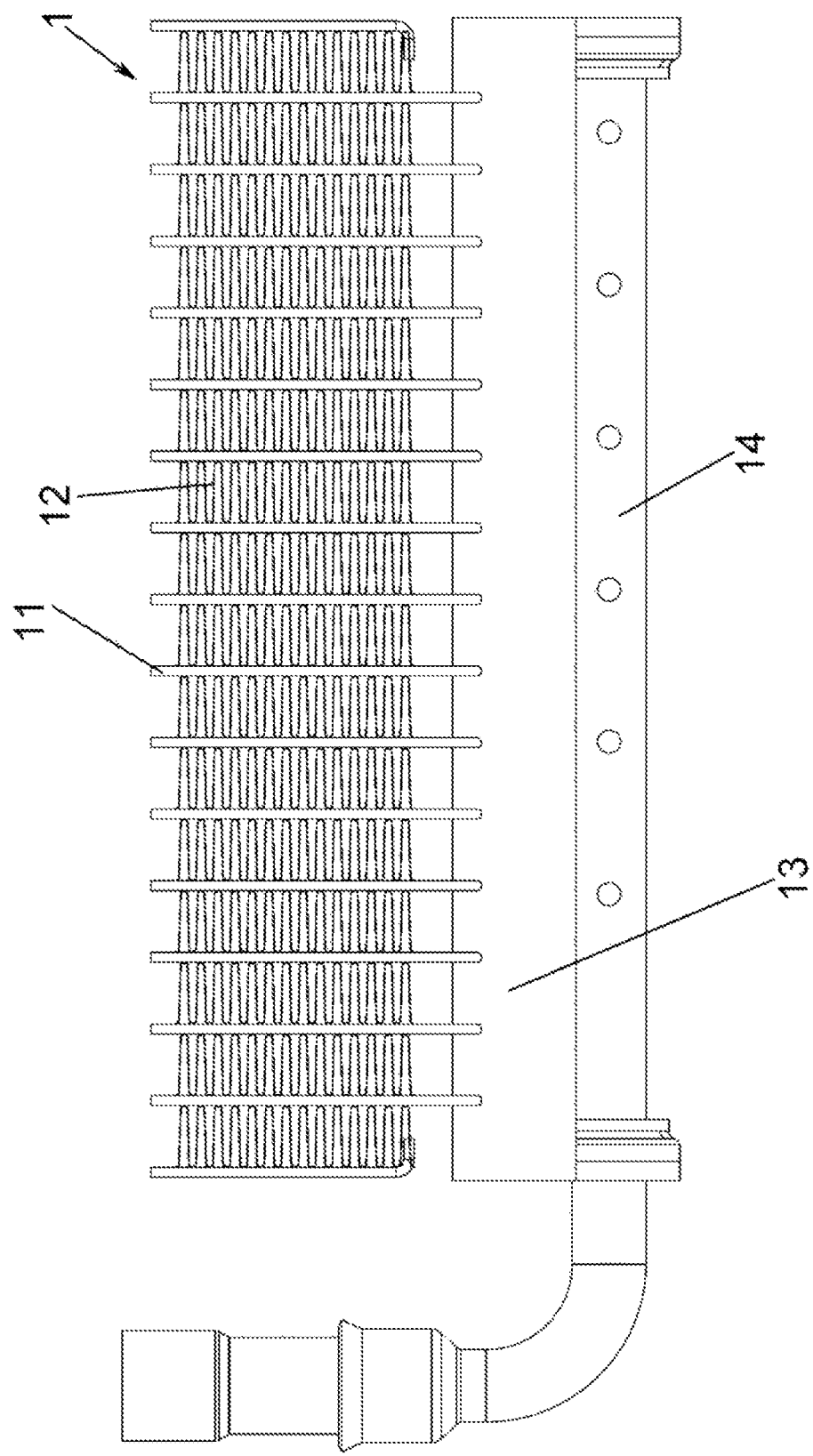
FIG. 11 is a schematic main view of part of the heat exchanger shown in FIG. 10, with the manifold cut open.
Figure 12:
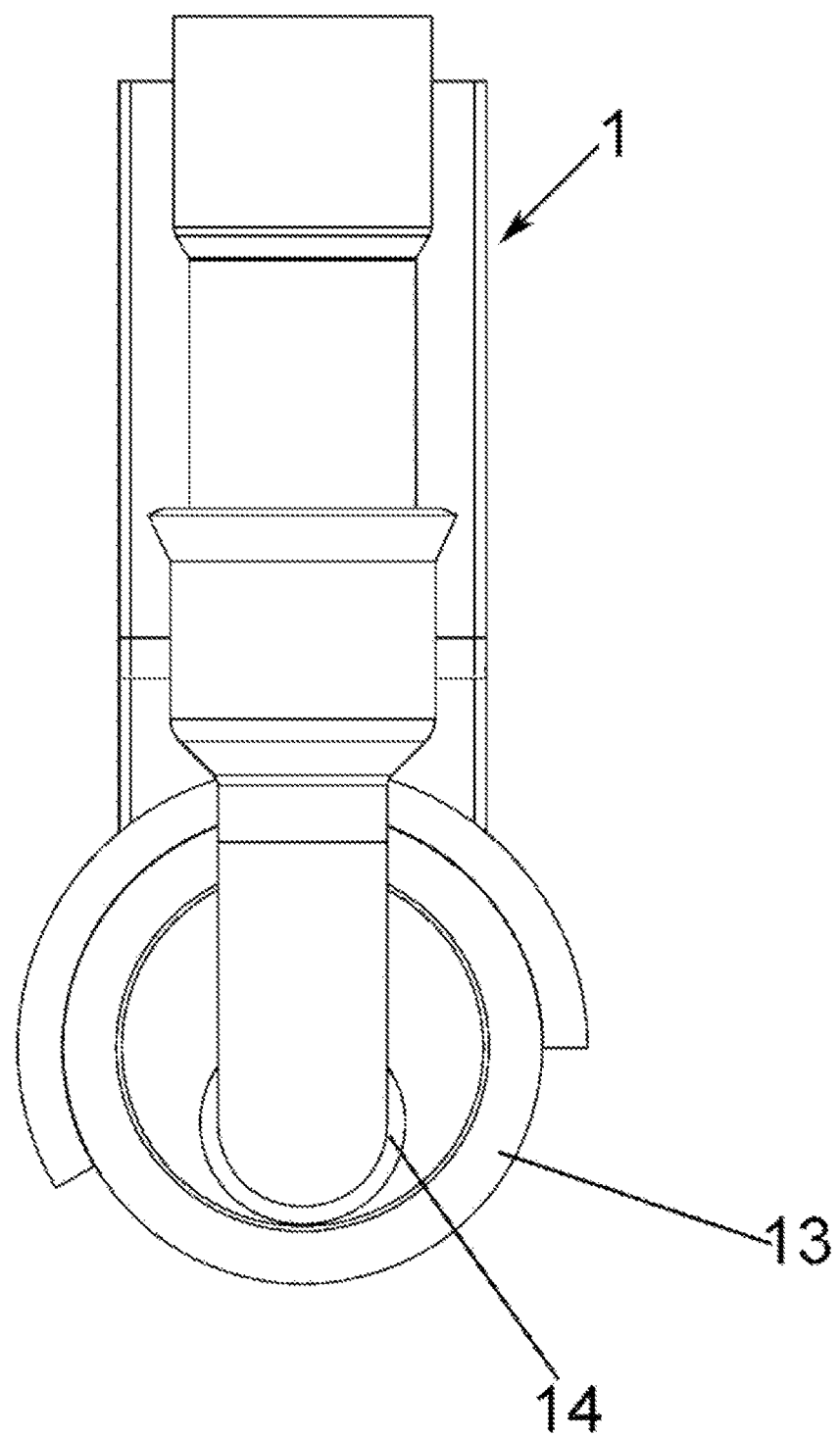
FIG. 12 is a schematic side view of part of the heat exchanger shown in FIG. 10.
Figure 13:
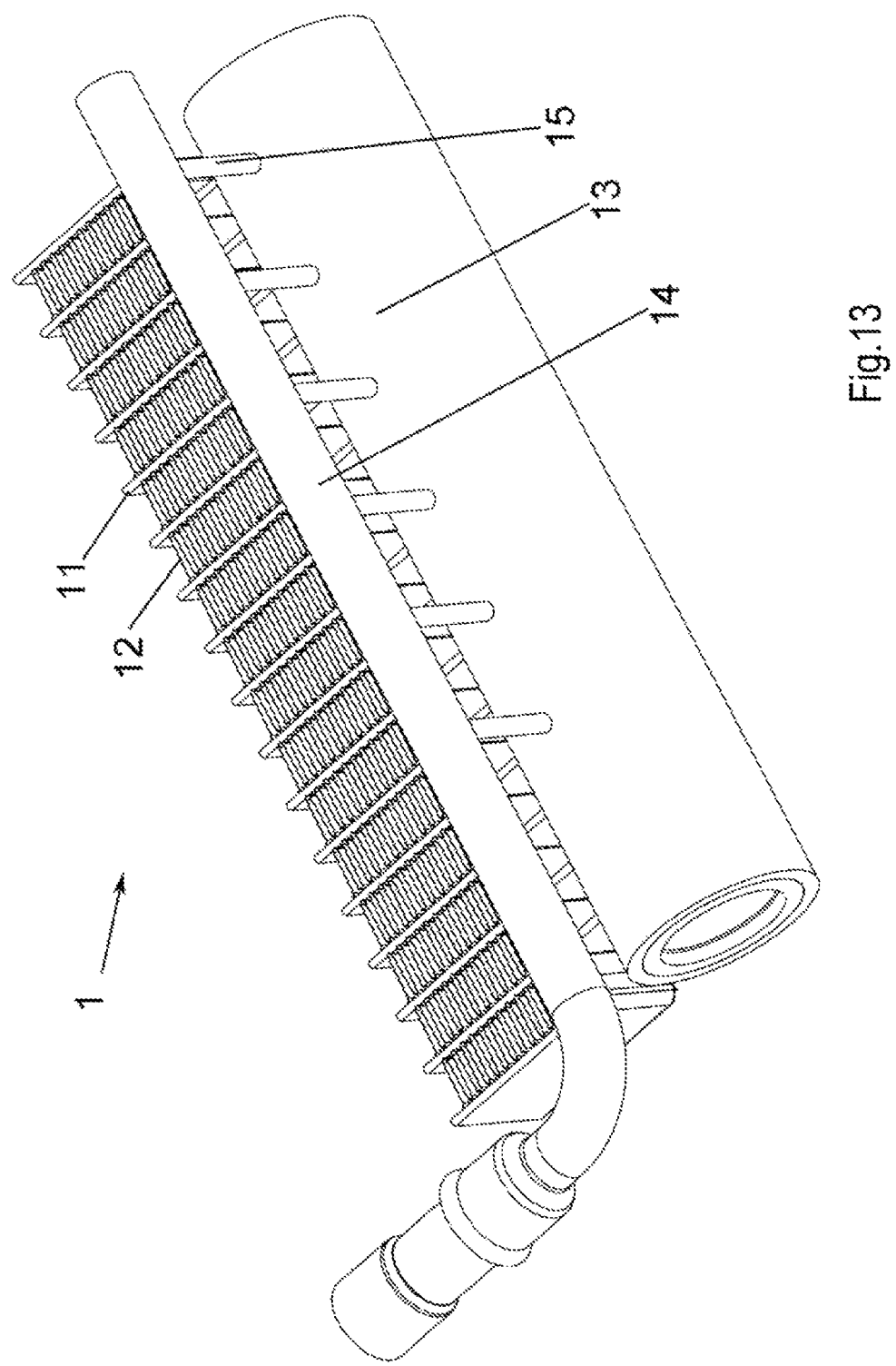
FIG. 13 is a schematic perspective view of part of a heat exchanger according to embodiments of the present invention, showing a refrigerant distributing means.
Figure 14:
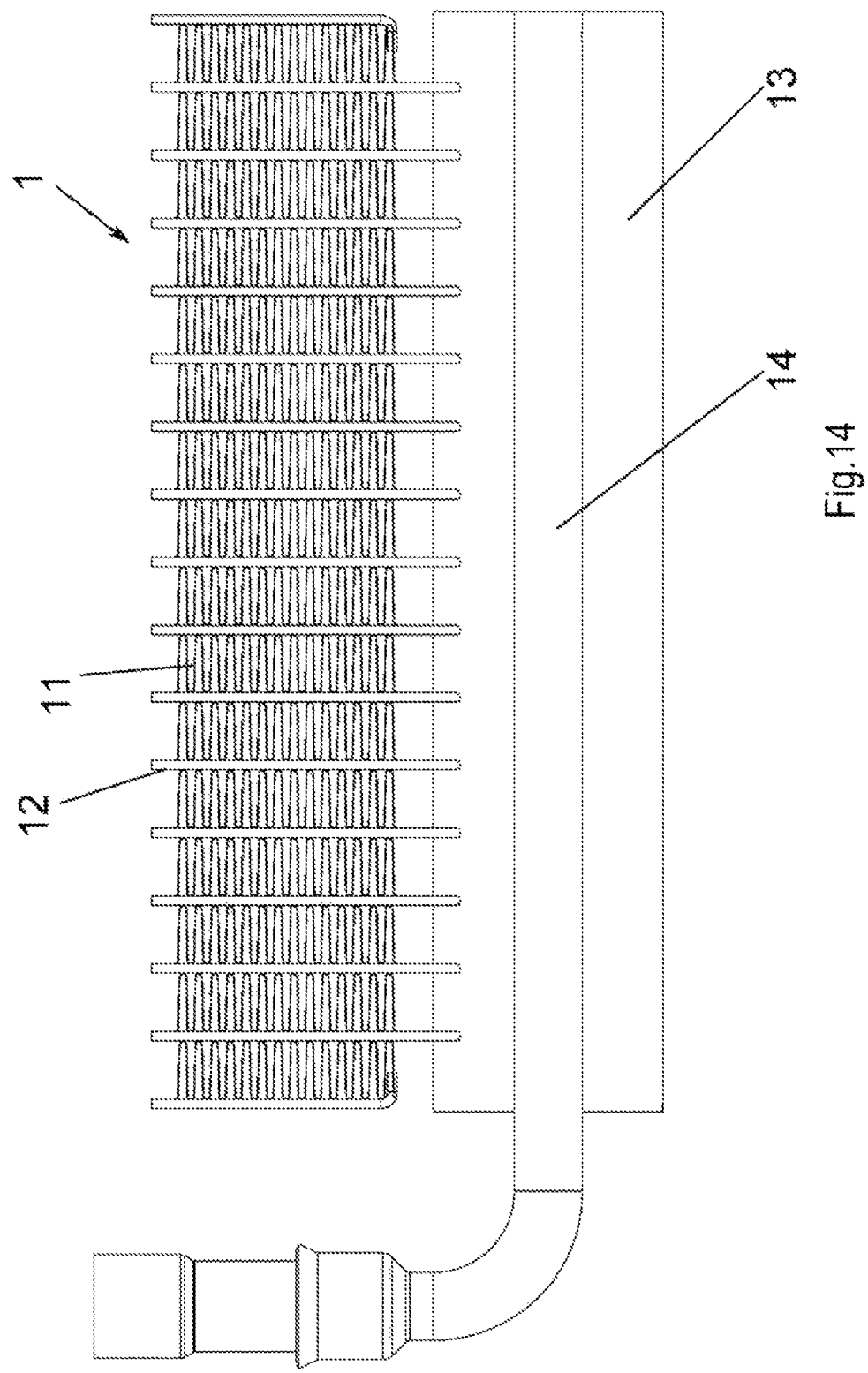
FIG. 14 is a schematic main view of part of the heat exchanger shown in FIG. 13.
Figure 15:
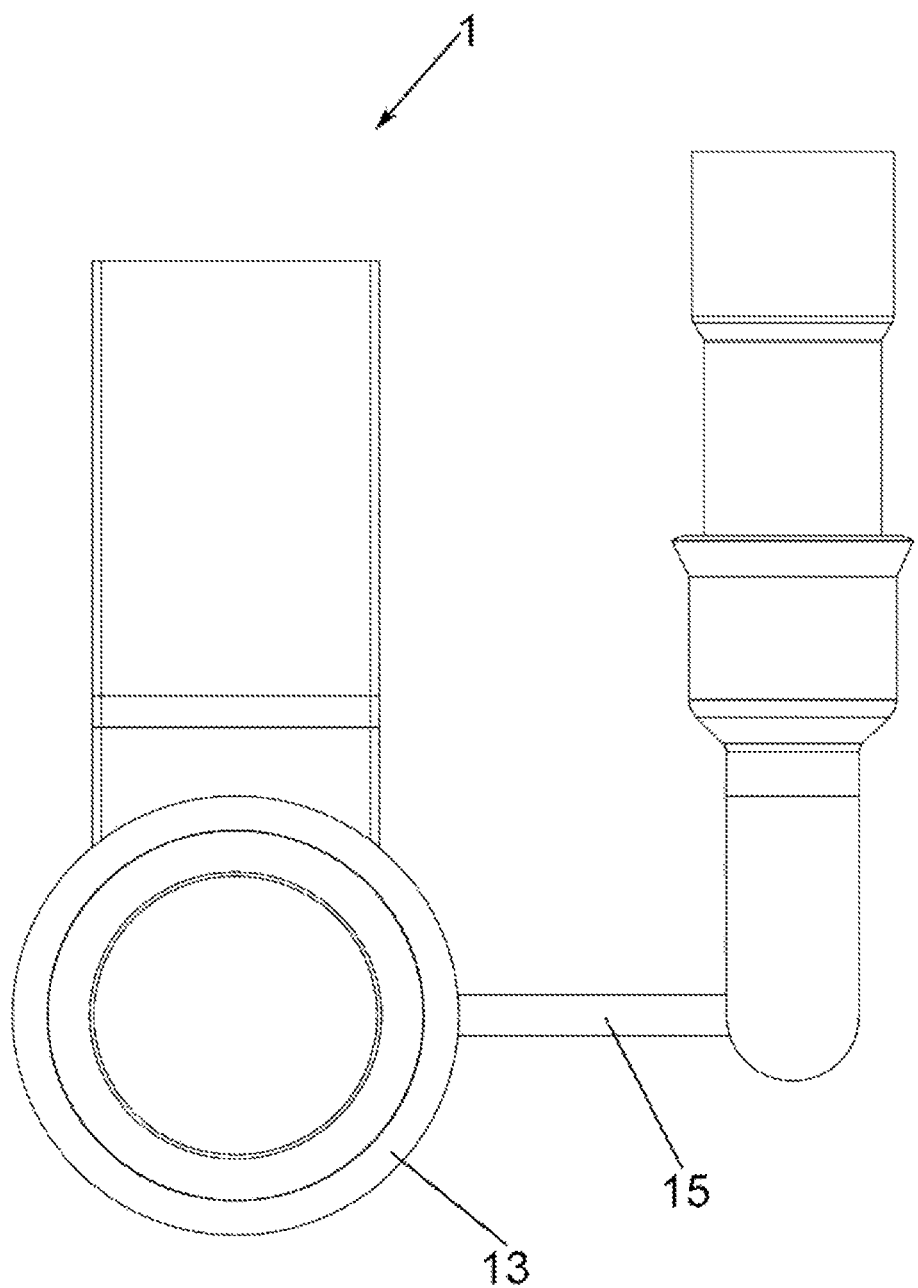
FIG. 15 is a schematic side view of part of the heat exchanger shown in FIG. 13.

Referring to FIGS. 10-15, in embodiments of the present invention, the heat exchanger 100 further comprises a refrigerant distributing means 14; referring to FIGS. 10-12, the refrigerant distributing means 14 is disposed in one of the first and second manifolds 13 and 23 which is at the refrigerant inlet side of the heat exchanger 100. Referring to FIGS. 13-15, the refrigerant distributing means 14 may also be disposed outside one of the first and second manifolds 13 and 23 which is at the refrigerant inlet side of the heat exchanger 100, and in fluid communication with said one manifold via multiple connecting tubes 15. For example, one or more connecting tubes 15 are used to establish fluid communication between a distributing tube serving as the refrigerant distributing means 14 and said one manifold, via one or more openings penetrating a tube wall of the distributing tube and one or more openings penetrating a tube wall of said one manifold. The distributing tube may extend in substantially the same direction as said one manifold. Referring to FIGS. 13-15, in the embodiment shown, the first manifold 13 is at the refrigerant inlet side of the heat exchanger 100. For example, one or more connecting tubes 15 are used to establish fluid communication between a distributing tube serving as the refrigerant distributing means 14 and the first manifold 13, via one or more openings penetrating a tube wall of the distributing tube and one or more openings penetrating a tube wall of the first manifold 13. The distributing tube may extend in substantially the same direction as the first manifold 13.

Referring to FIGS. 1, 7, 8 and 9, in embodiments of the present invention, the first manifold 13 is used to flow refrigerant into the heat exchanger 100, and the second manifold 23 is used to flow refrigerant out of the heat exchanger 100. That is, the first manifold 13 is an inlet manifold, and the second manifold 23 is an outlet manifold. According to examples of the present invention, the first manifold 13 is fitted with a refrigerant distributor or distributing tube, which can suitably distribute refrigerant to flow uniformly into the first heat exchange tubes 11; the second manifold 23 is fitted with a refrigerant collector or collecting tube, which can suitably regulate the refrigerant pressure distribution, so that the amount of condensed water generated is distributed more uniformly.

In embodiments of the present invention, referring to FIG. 1, during use of an air conditioning system comprising the heat exchanger 100 according to the embodiments above, the first manifold 13 and the second manifold 23 are arranged horizontally, and/or one of the first manifold 13 and the second manifold 23 is below the other during use. During use, the second heat exchanger core 2 may be located upstream of the first heat exchanger core 1 in a direction A of air flow through the heat exchanger 100.

In embodiments of the present invention, referring to FIG. 1, the manifold at the refrigerant inlet side may be fitted with a refrigerant distributor, and the manifold at the refrigerant outlet side may be fitted with a refrigerant collector.

In embodiments of the present invention, referring to FIG. 1, the heat exchange tubes may be flat tubes; in addition, a plane parallel to the heat exchanger core is perpendicular to the thickness direction of the heat exchanger core.

Using the heat exchanger 100 according to embodiments of the present invention, the water drainage performance of the heat exchanger 100 can be improved.

Using the heat exchanger 100 according to embodiments of the present invention, it is possible to suitably adjust the heat exchange intensity of different heat exchanger cores, and adjust the distribution of the heat exchanger's condensed water amount between different heat exchanger cores; and by reducing the condensed water amount of the heat exchanger core close to the indoor side (e.g. the first heat exchanger core 1), the problem of water being blown from the air conditioning system can be solved.

Although the above embodiments have been described, certain features in the above embodiments can be combined to form new embodiments.

Furthermore, although embodiments of the present invention have already been described, the above embodiments are merely examples used for facilitating understanding of the present invention, and are not used for limitation. Those skilled in the art may modify the above embodiments without departing from the spirit and scope of the present invention.

What is claimed is:

1. A heat exchanger, comprising:
   a first heat exchanger core, comprising: first heat exchange tubes, having first ends and second ends; and first fins arranged alternately with the first heat exchange tubes; and
   a second heat exchanger core, comprising: second heat exchange tubes, having first ends and second ends, the first ends of the second heat exchange tubes being connected to and in fluid communication with the first ends of the first heat exchange tubes; and second fins arranged alternately with the second heat exchange tubes, wherein:
   the first heat exchanger core is located at one side of the second heat exchanger core in a thickness direction of the second heat exchanger core, and an orthographic projection of the first heat exchanger core on a plane parallel to the second heat exchanger core at least partially overlaps the orthographic projection of the second heat exchanger core on a plane parallel to the second heat exchanger core,
   an angle between the first heat exchanger core and the second heat exchanger core is $\alpha$,
   a length of the first heat exchange tube of the first heat exchanger core is TL, a refrigerant circulation area of the first heat exchange tube is S, a width of the first fin is FW, a density of the first fin is FP, a height of the first fin is FH, and a dimension of the first heat exchanger core in the direction of alternate arrangement of the first fins and the first heat exchange tubes is ML,
   a length of the second heat exchange tube of the second heat exchanger core is tl, a refrigerant circulation area of the second heat exchange tube is s, a width of the second fin is fw, a density of the second fin is fp, a height of the second fin is fh, and a dimension of the second heat exchanger core in the direction of alternate arrangement of the second fins and the second heat exchange tubes is ml, and $0.016 \leq (TL \times ML \times FW \times FP \times FH \times s \times \cos \alpha)/(tl \times ml \times fw \times fp \times fh \times S) \leq 64$.

2. The heat exchanger as claimed in claim 1, wherein:

$0° \leq \alpha \geq 45°$.

3. The heat exchanger as claimed in claim 1, wherein:

$0.005 \leq (TL \times ML \times FW \times FP \times FH)/(tl \times ml \times fw \times fp \times fh) \leq 18$.

4. The heat exchanger as claimed in claim 1, wherein:

$0.09 \leq (TL \times ML)/(tl \times ml) \leq 0.95$.

5. The heat exchanger as claimed in claim 1, wherein:

$0.21 \leq TL \times \cos \alpha/tl \leq 0.95$.

6. The heat exchanger as claimed in claim 1, wherein:

$0.05 \leq (FW \times FP \times FH)/(fw \times fp \times fh) \leq 18$.

7. The heat exchanger as claimed in claim 1, wherein:

$0.2 \leq (FW \times FP)/(fw \times fp) \leq 9$.

8. The heat exchanger as claimed in claim 1, wherein:

$0.28 \leq (TL \times s)/(tl \times S) \leq 3.5$.

9. The heat exchanger as claimed in claim 1, wherein:
   the first heat exchange tube and second heat exchange tube are formed by bending a heat exchange tube, or the first heat exchanger core and second heat exchanger core are formed by bending a heat exchanger core.

10. The heat exchanger as claimed in claim 1, further comprising:
    a connecting part, wherein the first ends of the first heat exchange tubes of the first heat exchanger core are connected to and in fluid communication with the first ends of the second heat exchange tubes of the second heat exchanger core by means of the connecting part.

11. The heat exchanger as claimed in claim 10, wherein:
    the connecting part comprises connecting tubes, and the first ends of the first heat exchange tubes of the first heat exchanger core are connected to and in fluid communication with the first ends of the second heat exchange tubes of the second heat exchanger core by means of the connecting tubes.

12. The heat exchanger as claimed in claim 10, wherein:
    the connecting part comprises two connecting manifolds in fluid communication with each other;
    one of the two connecting manifolds is connected to and in fluid communication with the first ends of the first heat exchange tubes of the first heat exchanger core, and the other of the two connecting manifolds is connected to and in fluid communication with the first ends of the second heat exchange tubes of the second heat exchanger core.

13. The heat exchanger as claimed in claim 1, further comprising:
    a first manifold, connected to and in fluid communication with the second ends of the first heat exchange tubes of the first heat exchanger core, and
    a second manifold, connected to and in fluid communication with the second ends of the second heat exchange tubes of the second heat exchanger core.

14. The heat exchanger as claimed in claim 13, further comprising:
    an outlet side manifold, the outlet side manifold being in fluid communication, via a connecting tube, with one of the first and second manifolds which is at a refrigerant outlet side of the heat exchanger.

15. The heat exchanger as claimed in claim 13, further comprising:
    a refrigerant distributing means,
    wherein the refrigerant distributing means is disposed in one of the first and second manifolds which is at a refrigerant inlet side of the heat exchanger; or
    the refrigerant distributing means is disposed outside one of the first and second manifolds which is at the refrigerant inlet side of the heat exchanger, and in fluid communication with said one manifold via multiple connecting tubes.

16. The heat exchanger as claimed in claim 13, wherein:
the cross-sectional area of one of the first and second manifolds which is at a refrigerant inlet side of the heat exchanger is smaller than the cross-sectional area of the other of the first and second manifolds which is at a refrigerant outlet side of the heat exchanger.

17. The heat exchanger as claimed in claim 13, wherein:
the first manifold is used to flow refrigerant into the heat exchanger, and the second manifold is used to flow refrigerant out of the heat exchanger.

18. An air conditioning system, comprising:
the heat exchanger as claimed in claim 1.

19. The air conditioning system as claimed in claim 18, wherein:
the heat exchanger further comprises:
a first manifold, connected to and in fluid communication with the second ends of the first heat exchange tubes of the first heat exchanger core, and
a second manifold, connected to and in fluid communication with the second ends of the second heat exchange tubes of the second heat exchanger core; and
the first manifold and the second manifold are arranged horizontally during use, and/or one of the first manifold and the second manifold is below the other during use.

20. The air conditioning system as claimed in claim 18, wherein:
during use, the second heat exchanger core is located upstream of the first heat exchanger core in a direction of air flow through the heat exchanger.

\* \* \* \* \*